May 6, 1952     R. SONNENBERG     2,596,050
CAPMAKING MACHINE
Filed Oct. 31, 1945

FIG. 3
FIG. 4
FIG. 5
FIG. 6

INVENTOR
Rudolph Sonnenberg
BY
McCanna and Morsbach

May 6, 1952 R. SONNENBERG 2,596,050
CAPMAKING MACHINE
Filed Oct. 31, 1945 9 Sheets-Sheet 5

INVENTOR
Rudolph Sonnenberg
BY
McCanna and Morsbach

May 6, 1952     R. SONNENBERG     2,596,050
CAPMAKING MACHINE

Filed Oct. 31, 1945     9 Sheets-Sheet 7

INVENTOR
Rudolph Sonnenberg
BY
McCanna and Morsbach

May 6, 1952  R. SONNENBERG  2,596,050
CAPMAKING MACHINE
Filed Oct. 31, 1945  9 Sheets-Sheet 8

INVENTOR
Rudolph Sonnenberg
BY
McCanna and Morsbach

May 6, 1952  R. SONNENBERG  2,596,050
CAPMAKING MACHINE

Filed Oct. 31, 1945  9 Sheets-Sheet 9

Fig. 20

INVENTOR.
Rudolph Sonnenberg
BY
McCanna and Morsbach

Patented May 6, 1952

2,596,050

UNITED STATES PATENT OFFICE 2,596,050

CAPMAKING MACHINE

Rudolph Sonnenberg, Belvidere, Ill., assignor to Mid-West Bottle Cap Co., Belvidere, Ill., a corporation of Illinois Application October 31, 1945, Serial No. 625,838

15 Claims. (Cl. 93—1.3)

This invention relates to forming machines for bottle caps, and has special reference to a machine for preforming bottle caps of thin flexible material of the type adapted for use on dairy bottles.

An object of the invention is the provision of a cap forming machine wherein a strip of thin permanently deformable material such as metal foil is formed into a preformed cap in a single die operation and deposited in a nested stack in readiness for packaging.

Another object of the invention is the provision of a cap forming machine wherein separate sheets of different materials are superimposed one upon another and adhered together, and a preformed cap is made from the composite sheet.

A further object of the invention is the provision of a cap forming machine wherein the caps pass from the forming dies into a novel stacking mechanism in which the caps are nested into a stack, and means are provided for periodic removal of the stack without interfering with the progress of the forming operations.

A still further object is the provision of a cap forming machine having novel means for feeding the stock to the dies and novel means for rejecting the completed cap therefrom.

I have also aimed to provide a cap forming machine having improved means for cementing together separate sheets of material to form a composite sheet and for feeding the composite sheet into the dies.

A still further object of the invention is the provision of a cap forming machine having improved forming die structure and improved means for driving the same.

I have further aimed to provide a cap forming machine having cooperative dies of improved structure for high speed forming of a dairy bottle cap from very thin, easily ruptured and distorted material.

Another object of the invention is the provision of a machine of the class described having improved means for applying adhesive to the stock to facilitate the production of a composite sheet.

Other object will appear from the following description and the accompanying drawings, in which.

The embodiment of the invention herein disclosed comprises a body member designated generally by the numeral 22 (Fig. 1) having depending legs 23 for supporting the body in convenient working position. Disposed between the legs 23 is a shelf 24 for supporting a motor 25 which provides the motive power for driving the machine. The motor 25 drives a pulley 26 which is carried on a shaft 27 having bearing support in the legs 23. One end of the shaft 27 has a small sprocket, not shown, which serves to drive a chain 28 (Fig. 7) trained over a sprocket 29 fixed to a flywheel 31. The two sprockets, the chain and the flywheel, are housed in a guard 32 attached to the frame structure as will be apparent from Fig. 1. The flywheel 31 is mounted on a shaft 33 and is connected in driving relationship therewith through a clutch comprising a clutch member 34 keyed to the shaft 33 and secured thereon by a nut 35, a clutch plate of friction material 36 being interposed between the clutch element 34 and one face of the sprocket 29. Except for this frictional clutch connection, the flywheel 31 is free to rotate on the shaft 33, thus providing an arrangement in which the sprocket and flywheel normally serve to drive the shaft 33 through the frictional clutch but in which slippage may occur between these parts in the event of an unduly heavy load being placed on the operating mechanism, such as might occur if material of unusual thickness enters between the die set, or other parts of the device are prevented from operating. Thus the clutch serves as a safety device to prevent breakage of parts under such circumstances.

Figure 11:
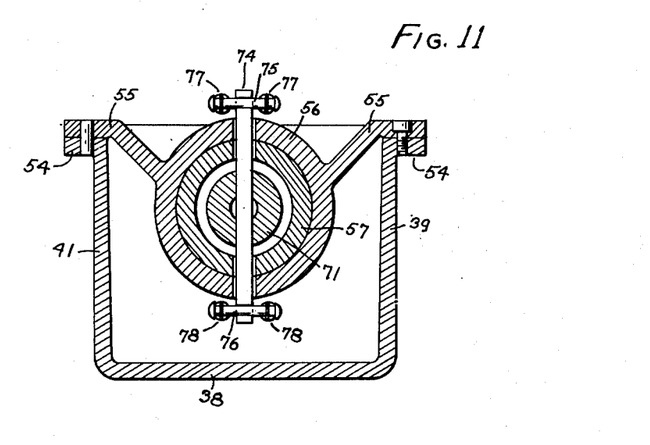
Fig. 11 is a section on the line 11—11 of Fig. 8.

The shaft 33 is journaled in the body 22, the body being a box-like structure, in this instance formed of cast metal having a bottom wall 38 (Fig. 8), upstanding side walls 39 and 41 and an end wall 42, the side walls 39 and 41 having bosses 43 and 44 for supporting anti-friction bearings 45 in which the shaft 33 is supported for rotation. Fixed to the shaft 33 intermediate the body walls 39 and 41 is a pair of cams 46 and 47 arranged to drive one element of the die set, and a cam 48 arranged to drive another element thereof, as will presently be more fully described. Also positioned on the shaft 33 adjacent the end thereof and adjacent the outer side of the body wall 41 are two cams 49 and 51 (see Fig. 3) and a crank 52, one of these cams functioning in the operation of the die set, while the other cam and the crank function to drive the stock feeding mechanism and the cap stacking mechanism as will presently appear. The upper edges of the body side walls 39 and 41 are provided with laterally disposed flanges such as shown at 54 to which are attached flanges 55 of a tubular guide 56 for the die mechanism. (See Figs. 7 and 11.)

Die mechanism

The die mechanism herein shown is constructed to form a cap of the nature shown in my U. S. Patent No. 2,361,507 having a central depressed mouth spanning portion, identified by numeral 21 in said patent, a rim portion 12 and a pleated skirt 11.

Figure 7:
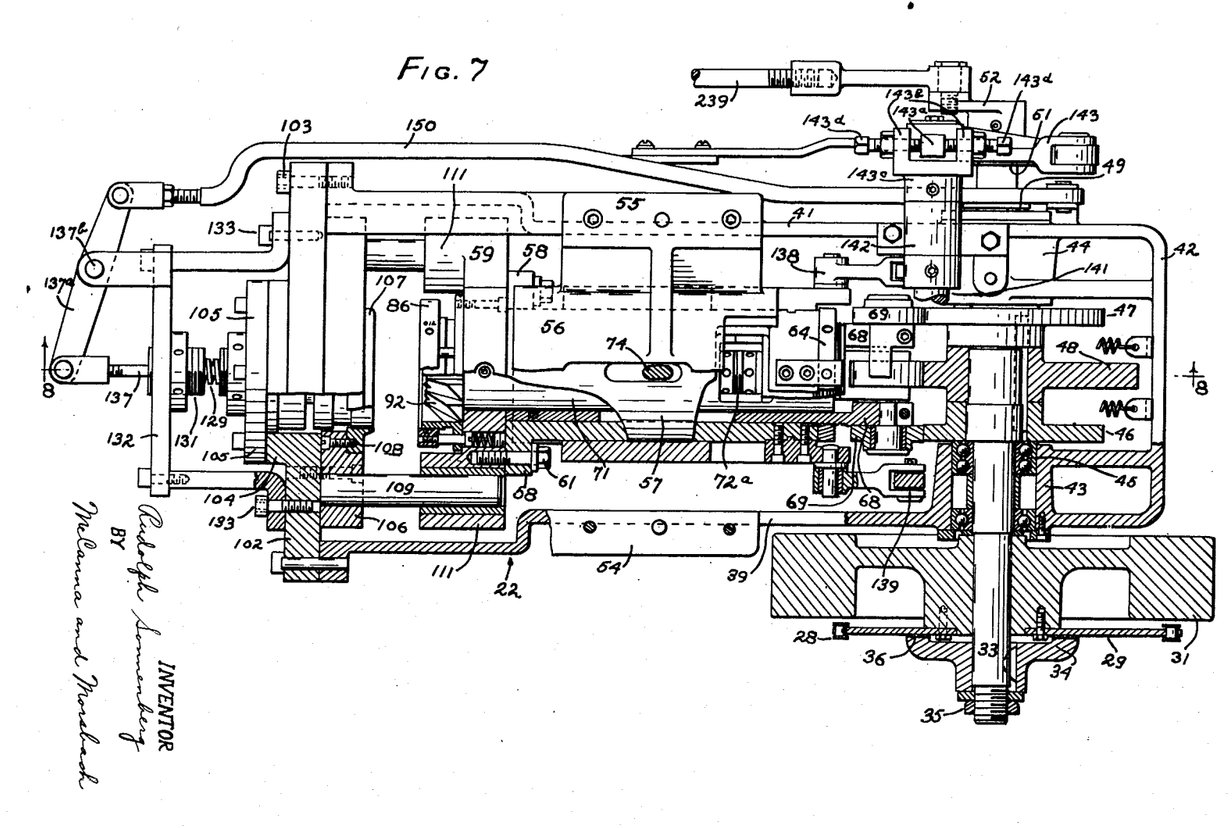
Fig. 7 is a top view of the die mechanism and a part of the drive therefor, certain parts being shown in section.
Figures 8, 9:
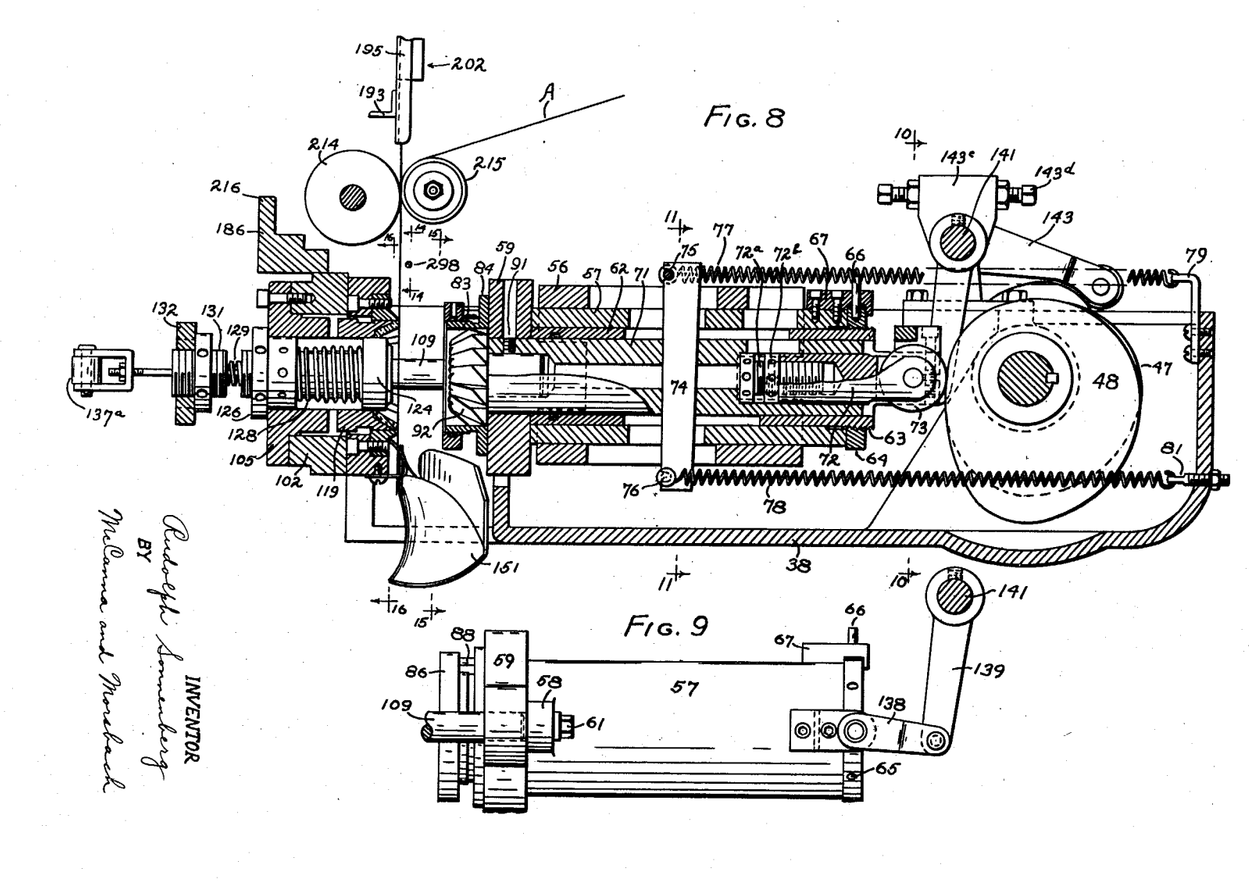
Fig. 8 is a section substantially on the line 8—8 of Fig. 7.
Fig. 9 is a side elevation of the male die holder and a portion of its drive.
Figure 10:
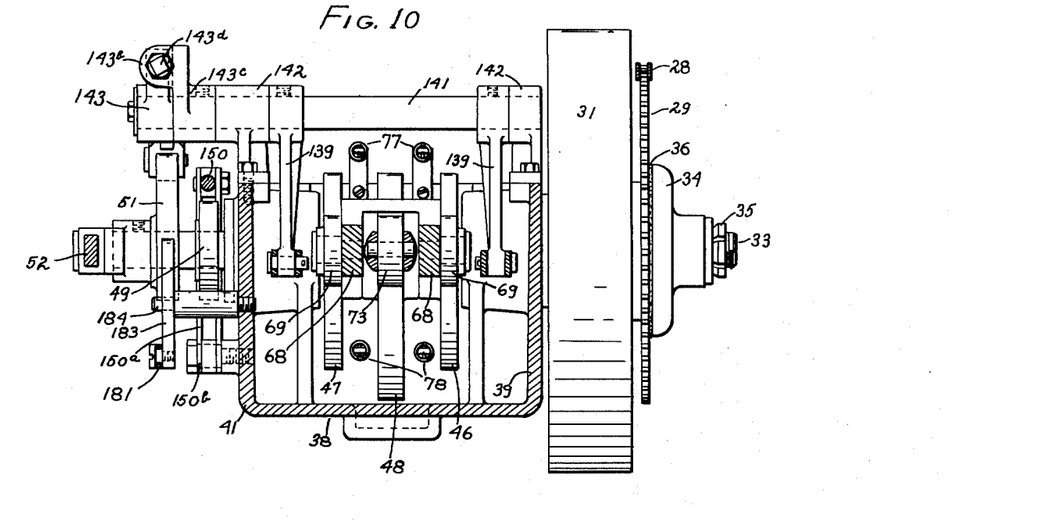
Fig. 10 is a view partly in section substantially on the line 10—10 of Fig. 8.

The blanking and forming die set comprises a male die element carried on the guide 56 and driven from the shaft 33, and a female die element carried on the end of the body opposite the end 42 as will be apparent from Figs. 7 and 8. The male die element is shown in elevation in Fig. 9, this element being supported in the guide 56 for longitudinal movement therein. The male die element includes a tubular die holder designated generally by the numeral 57 mounted in the guide 56 for longitudinal reciprocation with respect thereto. One end of the die holder 57 has laterally disposed ears 58 thereon (Fig. 7) to which a head 59 is attached by means of cap screws 61. Disposed within the die holder 57 is a tube 62, the tube being externally threaded at one end as shown at 63 (Fig. 8) for the reception of an adjusting nut 64. The nut 64 has a plurality of annularly spaced openings as shown at 65 (Fig. 9) for the reception of a pin 66 removably anchored in a block 67 attached to the die holder 57 by means of cap screws or other devices as will be apparent from Figs. 7 through 9. This serves to fixedly interconnect the die holder 57 and the tube 62 and yet to permit longitudinal adjustment of these two parts as may be required for different thicknesses of stock passing between the dies. The tube 62 has a pair of longitudinally disposed ears 68 adjacent the threaded end adapted to support cam followers in the form of rollers 69 arranged to engage the surfaces of the cams 46 and 47 on the shaft 33 for the purpose of moving the die holder 57 through the working portion of its stroke, or in other words toward the left facing Figs. 7 and 8. Disposed within the tube 62 is a plunger 71 adapted to carry the male forming die assembly portion of the male die element, the plunger being reciprocable longitudinally with respect to the sleeve 62. Carried on one end of the plunger 71 is a plunger extension member 72 which carries a cam follower in the form of a roller 73 adapted to bear against the cam 48 on the shaft 33 for the purpose of moving the plunger in its working stroke toward the left facing Figs. 7 and 8. The plunger extension member 72 comprises a cylindrical element positioned in a counterbore in the plunger having a screw threaded plug 72a therein adapted to seat against the end of the counterbore, having openings for rotation by a spanner wrench to screw the plug in or out and thereby adjust the position of the plunger for different thicknesses of stock. A lock nut 72b is positioned on the plug to hold it in adjusted position. Mounted in the plunger 71 and extending transversely thereof is a cross-arm 74, the cross-arm extending through slots in the tube 62, in the die holder 57, and in the guide 56 as will be apparent from Fig. 8. Pins 75 and 76 are disposed in the cross-arm 74, each of these pins carrying a pair of springs as indicated at 77 and 78 (Figs. 8 and 11), the opposite ends of these springs being mounted on the body as shown at 79 and 81, these coil springs acting to move the plunger 71 and the associated mechanism toward the right facing Figs. 7 and 8, or in other words, in the return stroke.

Figure 17:
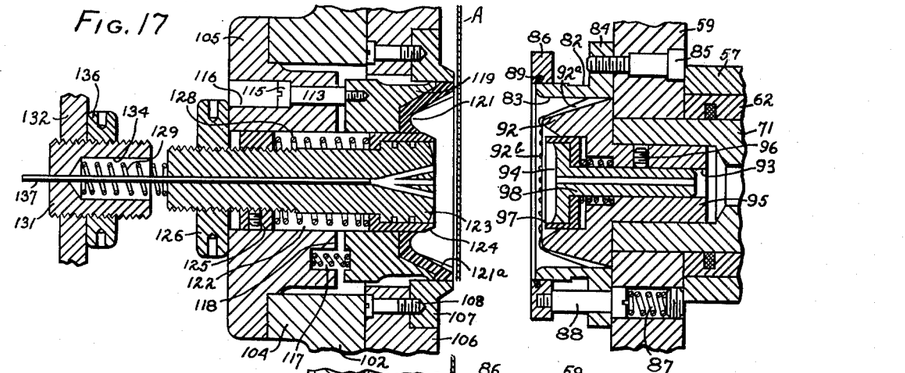
Fig. 17 through Fig. 19 are fragmentary sections through the die members showing successive steps in the operation of the dies.
Figure 18:
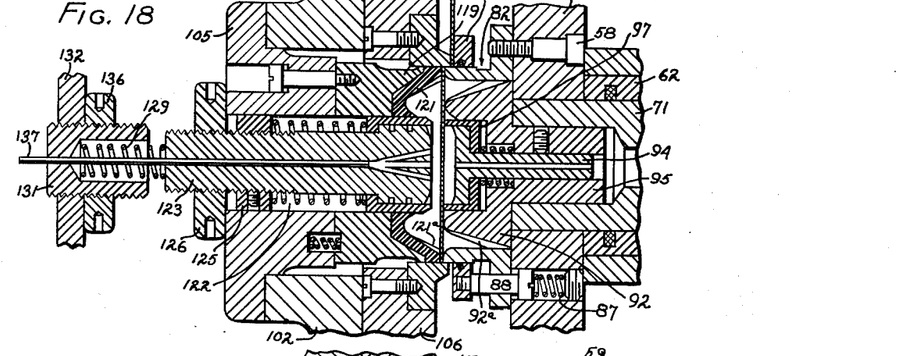
Figure 19:
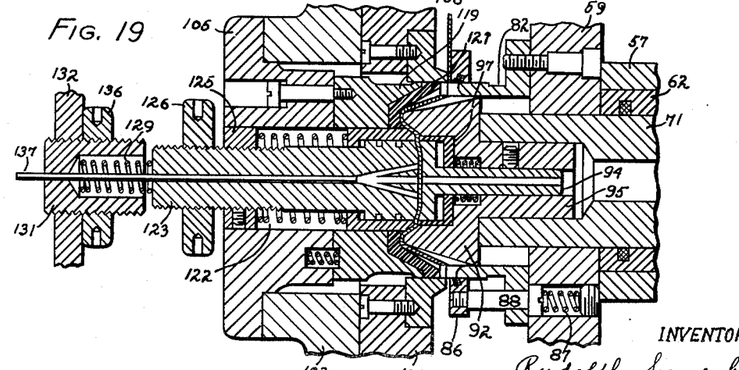

Secured against the face of the head 59 is a punch 82 (see Fig. 17) having a cylindrical punch and holder portion 83 and an annular flange 84 engaged by a series of screws 85 spaced annularly of the punch. Positioned on the outer surface of the punch portion 83 and adapted for movement longitudinally thereof is a striping and lubricating ring 86, spring pressed by means of springs 87 and bolts 88 as shown in Figs. 17 to 19 into the position shown in Fig. 17, the ring having a wick 89 therein for distributing lubricant over the outer surface of the punch as the ring moves from the position shown in Fig. 17 to the position shown in Fig. 18. Secured in the opposite end of the plunger 71, by means of a screw 91 (Fig. 8), is a male forming die assembly including a male skirt forming die 92, which in the open position of the die is housed within the blanking punch 82 as shown in Figs. 7 and 8. The male skirt forming die has a central bore 93 and a plurality of counterbores, the central bore 93 carrying a central forming member 94 on a pin 95 disposed in the bore 93 and secured therein by a screw 96. Positioned between the central forming member 94 and the skirt forming die 92 is a holder and striper 97, spring pressed into position against the back of the central forming member 94 by mean of a spring 98, but capable of movement to a bottom position such as shown in Fig. 19 in response to operation of the die. The female die member is carried on a plate 102 (see Fig. 7) secured across the end of the body opposite end 42, by cap screws 103, or the like. The plate 102 has a boss 104 to which is attached a tubular die carrier 105, and attached to the face of the plate 102 opposite the boss 104 is a holder 106 to which a female blanking die 107 is attached as by means of cap screws 108. Fixed in the holder 106 on diametrically opposed edges of the holder are guide pins 109 (See Fig. 7), these pins projecting outwardly in the direction of the male die element and having sliding engagement in laterally disposed ears 111 forming part of the head 59. The female blanking die 107 is of such shape and is so positioned on the holder 106 that the end of the punch 82 enters therein as shown in Fig. 18 for the purpose of shearing a blank from the strip of stock fed between the two die elements as will be apparent from Figs. 17 through 19. Disposed between the female blanking die and carried on the die carrier 105 is a female forming die assembly including a female skirt forming die having sliding engagement with the female blanking die. The female skirt forming die has a plurality of bolts 113 threaded into the back of the die and passing through openings in the die carrier 105, the bolts having heads 115 slidable in counterbores 116 and adapted to engage the end of the counterbores for the purpose of limiting the outward movement of the die. Also disposed between the back of the die and the die carrier and spaced annularly thereof are a plurality of springs 117 disposed in appropriate bores in the die and die carrier for the purpose of urging the female die outwardly toward the male die. As shown in Figs. 17 through 19 the die carrier 105 projects part way through the plate 102 to provide a surface 118 against which the female die bottoms at the end of the die stroke. The female skirt forming die comprises a body portion 119 preferably of metal and a face portion 121 preferably of mouldable material. The face portion 121 may be made of different types of mouldable material, though I prefer to form it of a cold moulded plastic such as methyl methacrylate and to mold it directly against the face of the male skirt forming die 92 so that the surfaces of these two complemental dies will match in every particular. For this reason, it is best that the face portion be formed of a mouldable material which does not shrink and the above mentioned material is one such material. On the other hand, the face may be made of rubber or numerous other relatively soft plastics as well as of soft metal, such as conventional die cast metal.

The die carrier 105 and the female skirt forming die are provided with a central opening 122 for the reception of a central forming die 123 and a female stripping die 124. The female central forming die projects beyond the surface of the die carrier 105 and is provided with annular threads for the reception of a guide nut 125 disposed within the opening 122 and having peripheral bearing thereon and a stop nut 126 of larger diameter than the opening 122 which serves to limit the forward movement of the female central forming die 123. The female stripping die 124 has sliding movement on the female central forming die and also with the female skirt forming die and serves to support the central die 123 for axial sliding movement. The female stripping die has a shoulder at its rear edge to cooperate with a complemental shoulder on the central die 123 and is urged to its forward position by a spring 128 acting against the collar 125. The die 123 is urged to its normal position by action of a spring 129 carried in a spring retainer 131 threaded into a bracket 132 (Fig. 7) attached to the plate 102 as indicated at 133. The spring retainer 131 has a central recess 134 for enclosing the spring and is externally threaded for the reception of a lock nut which serves to lock the retainer in selected position in the bracket and thereby adjust the stress on the spring 129. The central die 123 has an axial opening 136 through which a rod 137 passes and which acts to eject a finished cap from the dies where this may be necessary. The central bore 136 also permits the entrance of air to the surface of the cap between the cap and the die to prevent it being held on the die by air pressure.

Figure 15:
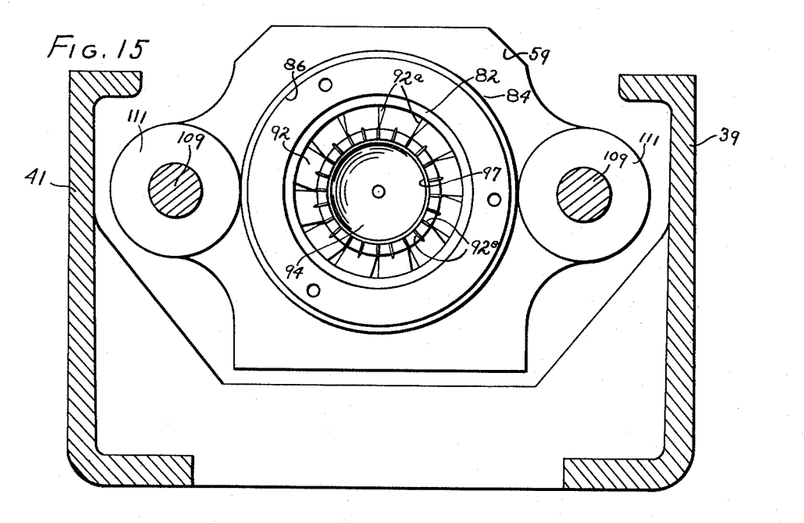
Fig. 15 is a view substantially on the line 15—15 of Fig. 8 showing the face of the male die holder.
Figure 16:
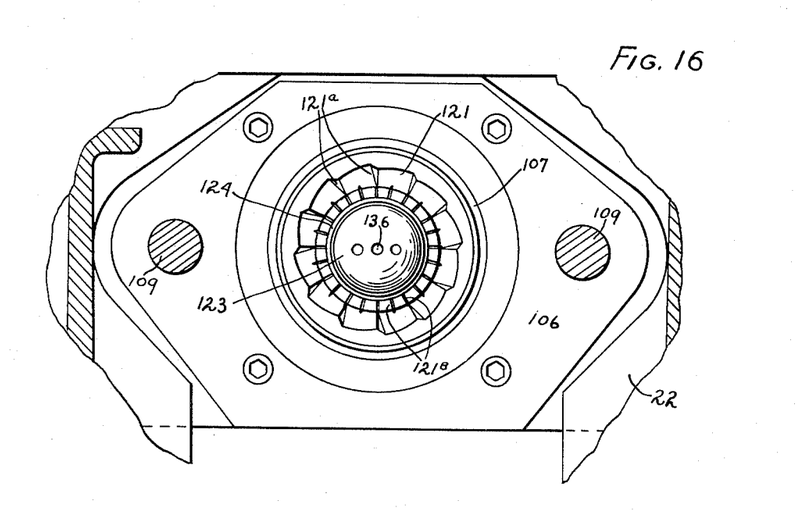
Fig. 16 is a view substantially on the line 16—16 of Fig. 8 showing the face of the female die member.

The male skirt forming die 92 and the female skirt forming die have complemental faces for the formation therebetween of the rim engaging portion and the pleated skirt of the cap, the male skirt forming die having shaped faces as shown at 92a for pleating the skirt and annularly spaced ribs 92b for forming spaced transverse ribs on the rim engaging portion of the cap. The female skirt forming die has complement shape characteristics as indicated at 121a and 121b. (See Figs. 15 to 17.)

*Die operation*

The stock, which may be of either single ply or of laminated form, is designated by the letter A and in this instance has a width substantially equal to the diameter of the punch 82 (and for lowest stock cost can be slightly less), so that the punch cuts substantially to the edge of the strip leaving a minimum amount of salvage. The stock A is fed downwardly between the male and female dies as indicated in Figs. 17 through 19 by mechanism presently to be described more in detail, the stock being fed in an intermittent manner a distance sufficient to provide a required amount of stock for each die operation. The parts occupy about the position shown in Figs. 7, 8 and 17 when the feeding operation occurs. Thereafter the cams 46 and 47 operating against rollers 69 move the die holder 57 and the tube 62 forward to bring the punch 83 into engagement with the stock. Continued movement of the punch shears the stock as the punch moves into the female blanking die as shown in Fig. 18. As the punch moves into this position it engages the periphery of the female skirt forming die, moving this die to its bottom position against the action of springs 117. The stripper and lubricating ring 86 forces the stock outside the blanking die against the outer face of the female blanking die and moves backward along the punch as shown in Fig. 18, simultaneously lubricating the outer surface of the punch by action of the wick 89, the springs 87 being compressed in this operation. During this blanking operation, the entire male die holder 57 moves forward as a body, the plunger 71 moving with the remainder of the mechanism. Upon the completion of the blanking operation the cam 48 acts on the roller follower 73 to move the plunger 71 and the male skirt forming die 92 forward into the position shown in Fig. 18. At this time the cap blank is held at its periphery between the forward face of the punch 83 and the face of the female skirt forming die. As the forward edge of the male skirt forming die 92 contacts the blank, the blank is pulled over the forward end of the die starting the folds of the skirt and the transverse ribs. As the male die 92 moves forward the increasing pressure tends to develop these folds and at the same time this pressure serves to draw the periphery of the blank out from between the punch and the female die. At about the same time, the male holder and stripper 97 forces the blank into contact with the female stripper 124 to hold the blank in a centered position after its release at the periphery. As the plunger continues to move forward the male holder and stripper 97 moves back to the position shown in Fig. 19 against the pressure of spring 98 to form the mouth spanning portion of the cap against the central forming member 123. Thereafter, the female holder and stripper 124 and the central forming member 123 move back to the position shown in Fig. 19 compressing springs 128 and 129 and completing the cap formation.

While the periphery of the blank is being withdrawn from between the punch and the female skirt forming die the punch is returned from the position shown in Fig. 18 and the stripper 86 moves back to its original position to move the strip of stock away from the punch. This is accomplished by means of a pair of links 138 pivotally attached to the rear end of the die holder 57 pivoted to arms 139 fixed to a cross shaft 141 which is journaled in a pair of brackets 142 attached to the upper edge of the body as will be apparent from Figs. 7 and 8. An arm 143 is carried on the end of the shaft 141 and carries a cam follower cooperating with the cam 51. The cam 51 is carried on the shaft 33 along with the cams 46, 47 and 48 and is so located as to swing the arm 143, to rotate the shaft and move the levers 139 and 138 and thereby retract the die holder 57 and the tube 62 leaving the plunger to its forward movement. The arm 143 has a lug 143a disposed between ears 143b on a yoke 143c (Fig. 7) fixed on the shaft 141, the ears having screws 143d for adjusting the relative positions of the yoke and the arm and through which driving force is transmitted from the lever to the shaft. This arrangement permits very close and accurate adjustment of the point in the operation of the dies at which the die holder is started on its return movement.

The cams 46 and 47 are so formed that as soon as the male die element reaches its forward position shown in Fig. 19, the cams recede from the rollers 69 and the entire die holder 57 moves back as a body toward the position of Fig. 17. During the early part of this movement the springs 128 and 129 and also the spring 117 move the parts of the female die element back toward the position of Fig. 17 thus moving the formed cap away from the female skirt forming die. At the same time the spring 98 urges the central male stripper forward to dislodge the cap from the end of the male skirt forming die. Ordinarily this will leave the formed cap free to drop out from between the die elements as soon as the die holder 57 is retracted sufficiently. However, in case the cap should tend to stick in the female die element the ejector rod 137 moves forward to contact the cap and move it away from the female die element. Disposed below the die seat is a chute 151 positioned to receive the cap as it drops from the die and to direct it to a suitable point of disposal. The ejector rod 137 is pivotally carried in a cross arm 137a pivoted on ears 137b and operated by a rod 150 reciprocated by a lever 150a pivoted to the body 150b and operated by the cam 49 attached to the shaft 33 thereby operating the ejector rod in timed relation to the dies.

*Cap stacking mechanism*

Figures 3, 4, 5, 6:
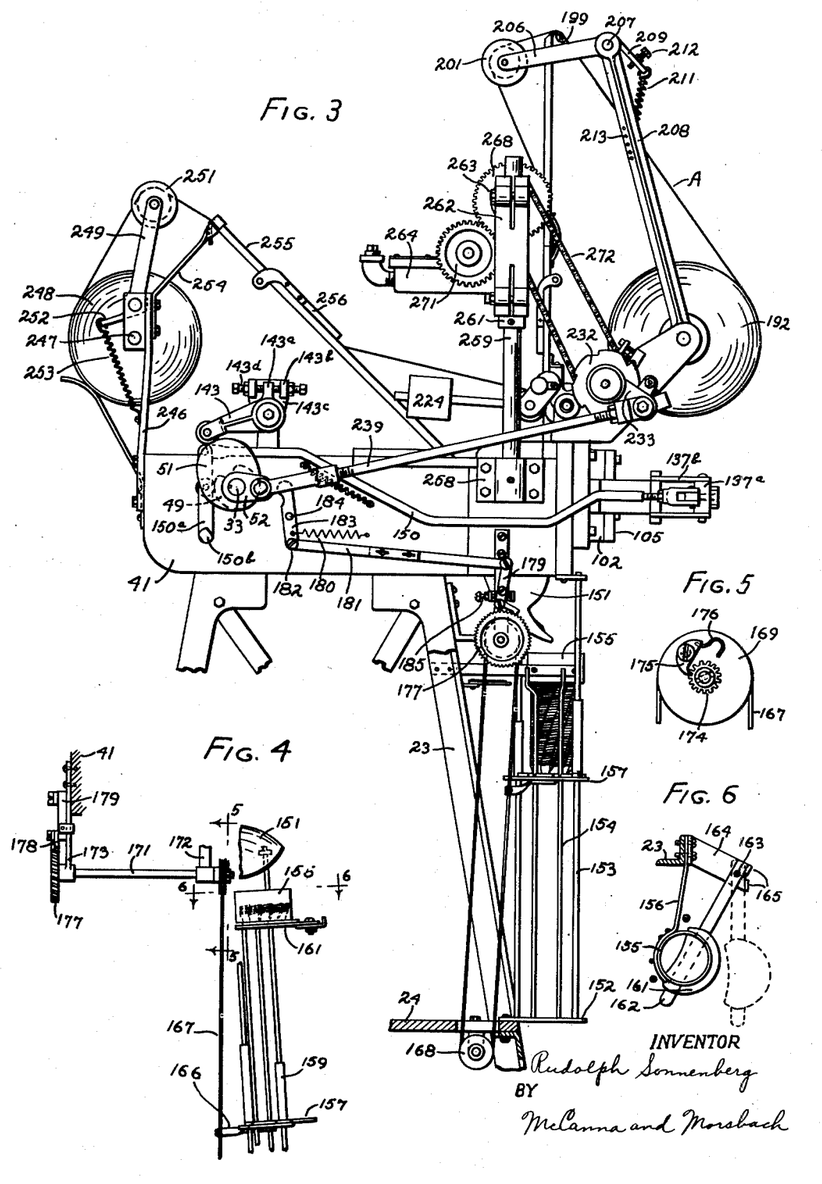
Fig. 3 is a side elevation with certain parts broken away to show the cap stacking mechanism.
Fig. 4 is a fragmentary view showing the cap stacking mechanism.
Fig. 5 is a view taken on the line 5—5 of Fig. 4.
Fig. 6 is a view taken on the line 6—6 of Fig. 4.

The formed cap is delivered through the chute 151 into a cap stacking mechanism which functions to arrange the caps in a stack and to permit the operator to periodically remove the caps for packaging. This includes a plate 152 attached to the shelf 24 having rods 153 extending from the plate to the lower side of the body 22 and intermediate upstanding rods 154 extending from the plate upwardly and attached at their upper ends to a tubular guide 155, the guide being attached to one of the legs 23 by means of a bracket 156, the guide 155 being disposed just below the end of the chute 151 in a position to receive the caps as they emerge from the chute. A shelf 157 is attached to a cross bar 158, the cross bar having tubular guide supports 159. The tubes 159 serve to guide and support the shelf for movement on the rods 153. Positioned directly below the guide 155 is a retainer comprising a retainer plate 161 (Fig. 6) carried on an arm 162 pivoted as shown at 163 on a bracket 164 attached to the leg 23 adjacent the bracket 156, the bracket 164 preferably having a pair of stops 165 for engagement with the arm 162 in the extreme positions of the retainer. One of these positions is directly below the guide 155 so that the caps falling out of the chute will drop onto the plate 161 for temporary support and the other position is that shown in dotted lines in Fig. 6, out of the path of the caps falling through the guide. The shelf 157 has a laterally disposed arm 166 clamped to a belt 167 by means of a screw as shown or by other suitable means, the belt 167 in this instance comprising an endless wire trained over a pulley 168 attached to the bottom of the shelf 24 and over a pulley 169 rotatably carried on a shaft 171 carried in bearings 172 and 173 attached to the bottom of the body 22 (Fig. 4). The end of the shaft 171 carries a spur gear 174 and the pulley 169 carries a dog 175 spring pressed into engagement with the gear by a spring 176. Attached to the other end of the shaft 171 is a gear 177 having teeth arranged helically thereon, the gear being driven by a pair of pawls 178 pivoted on a lever 179 so that upon reciprocation of the lever the gear is turned through only a portion of the distance defined by one tooth thereof. The lever 179 is reciprocated by a rod 181, formed of two interconnected overlapping pieces so that the length thereof can be adjusted, the end of the rod being pivotally supported as shown at 182 on a second lever 183 pivotally carried on a pin 184 affixed to the side of the body, one end of the lever 183 being disposed in the path of the cam 51 for operation thereby as will best be seen from Figs. 3 and 7. An adjustable stop 185 acts on the lever 179 to limit its movement and a spring 180 acts to return the lever.

It will be seen that upon each die operation the cam 51 actuates the lever 179 to rotate the gear 177 through a portion of the distance defined by a tooth on the gear thus advancing the belt 167 a short distance to correspondingly lower the shelf 157. The amount of advancement is adjusted to equal the vertical distance occupied by the cap formed by that particular die operation so that the top of the stock remains within the guide. The cap passes out of the chute 151 into the guide 155 which serves to confine the entering cap and cause it to nest into the proceeding cap and form a stack. As will be seen from Fig. 4 the rods 153 and 154 slope somewhat to facilitate uniformity in stacking and maintain the stock straight. When a suitable number of caps have accumulated in a stack on the shelf 157, the operator forces the shelf downward, the pulley 169 ratcheting with respect to the gear 174 to permit this operation. Simultaneously the operator throws the retainer plate 161 from the dotted line position shown in Fig. 6 into the full line position to temporarily retain the caps within the guide 155 as shown in Fig. 4 until the stack has been removed from the shelf 157 and the shelf repositioned. Thereafter the shelf 157 is reelevated to a point directly below the guide 155 and the retainer plate 161 is swung out to the dotted line position allowing the forming stack of caps to drop onto the shelf for continuation of the stacking operation.

Stock feeding mechanism

Figures 1, 2:
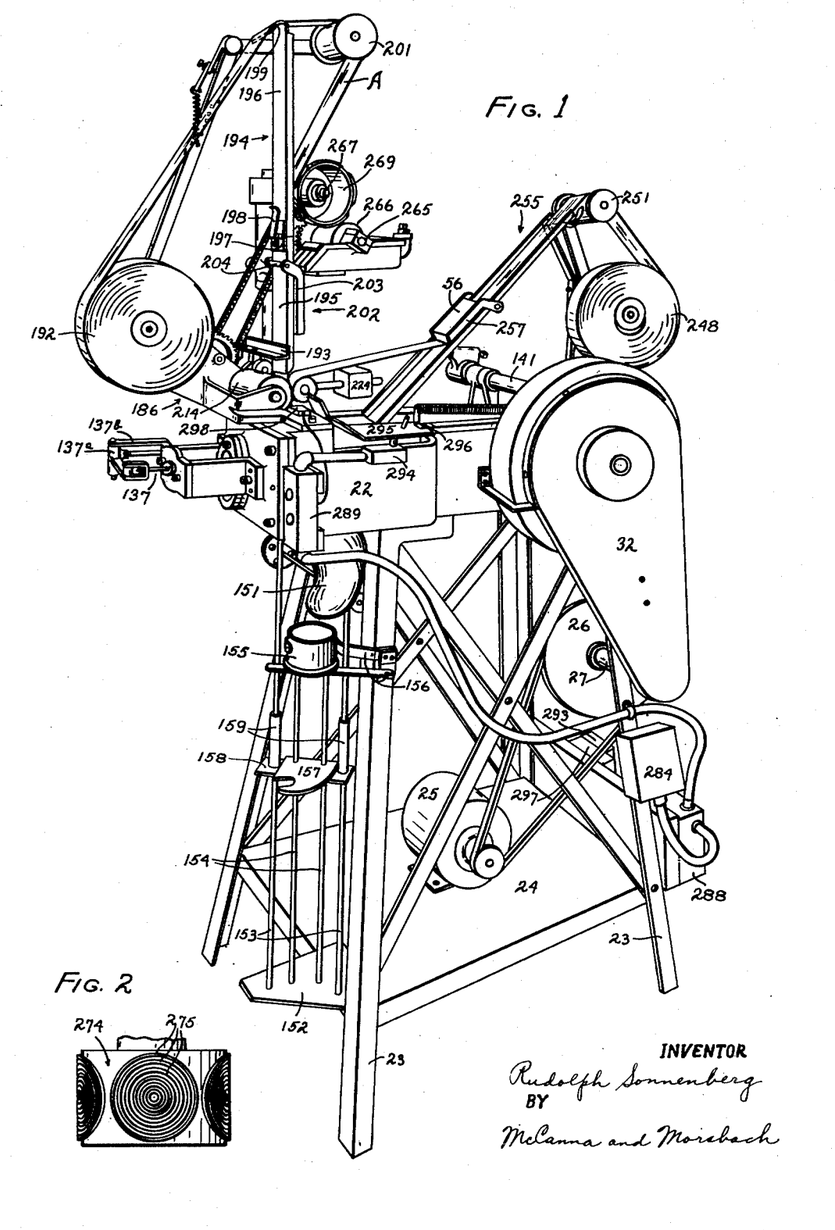
Figure 1 is a perspective view of the cap forming machine embodying my invention.
Fig. 2 is a face view of the adhesive applicator.

The stock feeding mechanism, best shown in Figs. 1, 3, 12 and 13, is in this instance mounted on the top of the body 22 and includes a base 186 fixed to the body above the female die element. The base has parallelly disposed vertical walls 187 which project outwardly at one end forming supports 188 carrying a horizontally disposed shaft 189 which is fixed with respect to the supports, the shaft carrying a spool 191 rotatably disposed on the shaft and adapted to support a roll 192 of foil or other analogous stock used in the machine. Attached to the vertical walls 187 is a bracket 193 (Figs. 1 and 12) which carries a vertically disposed stock guide 194. The guide 194 includes a lower section 195 rigidly attached to the bracket 193 and an upper section 196 hinged as shown at 197 to the lower section and spring pressed to the position shown in Fig. 1 by a leaf spring 198. Each of these sections is of substantially U-shaped cross section having a flat bottom substantially the width of the stock threading therethrough and upsanding side walls serving to maintain the stock in alignment as it passes to the rollers and dies. This guide is vertically arranged so that the inner face of the bottom will be in about the same plane as the inner face of the female blanking die. The upper end of the upper section 194 has a rounded end as shown at 199 over which the strip of stock from the roll 192 is trained as shown in Figs. 1 and 3. The strip thence passes over an idler roll 201 into contact with the guide 194. The guide has a block 202 disposed between the side walls thereof provided with side arms 203 on opposite sides thereof pivotally supported as shown at 204, the block having sufficient weight to hold the strip against the bottom of the guide. The roller 201 is pivotally carried on a lever 206 which is pivoted as shown at 207 on an arm 208 mounted at one end of the shaft 189 (Fig. 13), the lever 206 extending beyond the pivot point 207 as shown at 209 and having a coiled spring 211 attached thereto to urge the lever 206 upwardly and raise the roller, the raised position of the roller being adjustable by a screw 212 positioned to abut against the arm 208 to limit the upper position. The arm 218 has a plurality of openings as shown at 213 for adjusting the tension of the spring 211 as may be desired.

The stock is intermittently fed downwardly between the dies by a pair of rollers 214 and 215 (Figs. 12 and 13) supported directly above the die set. The roller 214 has trunnions at its ends one trunnion being supported directly in one of the upstanding walls 187 and the other trunnion being supported in a bearing in a laterally disposed portion 216 of the base as will be apparent from Fig. 13. The strip of stock passes between the two rollers 214 and 215 and has pressure applied thereto from the roller 215, this roller being supported on a shaft 217 mounted for rotation in a sleeve 218. This sleeve has ears 219 and 221 rotatably mounted on a pin 222 fixed in the upstanding walls 187 of the base. The sleeve 218 also has a rod 223 attached thereto carrying a weight 224 adjustable on the rod for the purpose of rotating the sleeve and roller about the pin 222 as will be apparent from Fig. 12. Because of the eccentricity of the shaft 217 with respect to the pin 222, the roller 215 is moved out of contact with the roller 214 when the rod 223 is moved from the full line position of Fig. 12 to the dotted line position thereof whereas the rollers approach each other when the rod is moved in the opposite direction and the weight 224 serves to apply a pressure between the rollers. The ear 221 carries a slidable pin 220 engageable in an opening 220a in one of the walls 187 to retain the roller in the dotted line position of Fig. 12, a spring 220b acting to normally urge the pin to the engaged position.

The roller 215 is provided with an outer coating or sleeve of hard material 225, the sleeve having peripheral slots 226 and 227 adjacent the end of the roller. The roll 214 has an outer coating of soft distortable rubber. As the thin metal foil from the roll 192 passes between the rollers 214 and 215, the peripheral slots form stiffening ribs 230 in the strip adjacent each edge of the strip in order to impart stiffness to the strip so that it can feed downward between the dies in substantially a straight line without curling or otherwise becoming misplaced. It will be observed that the stock is fed and controlled solely from above and the stiffening of the strip immediately before entry between the dies materially facilitates the operation. The stiffening ribs are ironed out of the stock in the dies.

To further insure proper feeding of the stock means hereinafter described are provided to stop the machine in the event that the stock fails to feed from the rolls to the dies in proper fashion.

Figure 12:
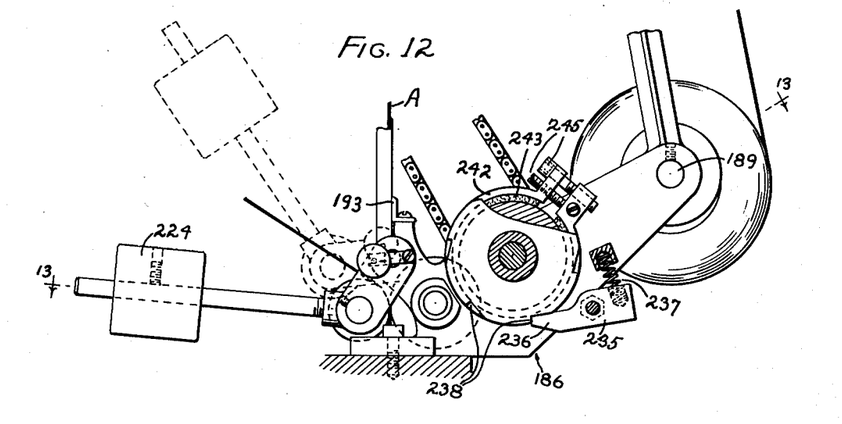
Fig. 12 is a side elevation of a part of the stock feeding mechanism.
Figures 13, 14:
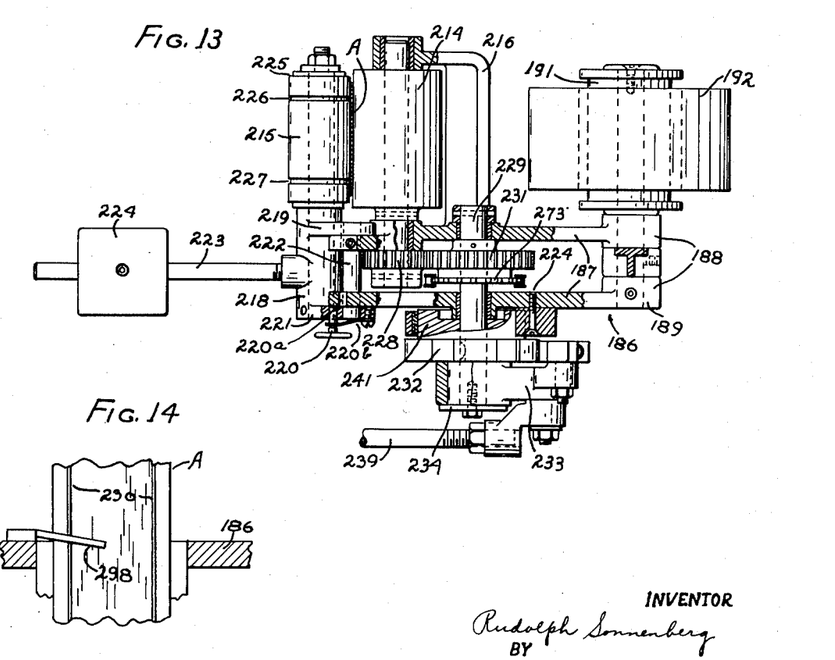
Fig. 13 is a view taken along the line 13—13 of Fig. 12.
Fig. 14 is a fragmentary view taken along the line 14—14 of Fig. 8.

The roller 214 acts to feed the stock downward between the rolls and for this purpose has a gear 228 fixedly mounted on one of the trunnions and disposed between the upright walls 187 of the base. Also mounted in these walls is a countershaft 229 having a gear 231 meshing with the gear 228, the countershaft projecting outwardly beyond the side of the base 186 and having keyed thereon a ratchet wheel 232. Rotatably carried on the countershaft 229 beyond the ratchet wheel is a crank 233 retained in position on the end of the shaft by a plate and cap screw 234. Pivotally carried on the crank 233 is a dog 235 (Fig. 12) having an end 236 spring pressed by a spring 237, into engagement with the periphery of the ratchet wheel 232, the ratchet wheel having spaced notches 238 in the periphery thereof spaced a distance suitable to feed the material required for each cap downwardly upon each indexing movement of the ratchet wheel. Connected with the crank 233 is a rod 239 having its opposite end pivotally connected to the crank 52 mounted on the shaft 33 (Figs. 3 and 7). It will, therefore, be seen that upon each revolution of the shaft 33 the crank 233 will be reciprocated and the ratchet wheel 232 will be moved forward one notch correspondingly rotating the roller 214 and feeding downward sufficient material for the next cap. Integral with the ratchet wheel 232 is a member 241 having cylindrical brake surface and extending annularly thereof is a brake band 242 having a friction surface 243 for engaging the surface of the brake member 241, the brake band being mounted to one of the upright walls 187 as shown in Figs. 12 and 13, as by means of a screw 244 and having set screws 245 for adjusting the frictional engagement of the parts. The band is so adjusted as to impart a slight frictional drag on the ratchet wheel 232 and shaft 229 to prevent coasting of the ratchet wheel and the roller 214 and thereby accurately feed the required amount of stock at each reciprocation of the crank and also to prevent reverse rotation of the shaft upon return movement of the crank 233. Attached to the end 42 of the body is an upright 246 (Fig. 3) carrying a horizontally disposed pin 247 adapted to support a roll of paper 248 for passage through the dies. Also attached to the upright 246 is a lever 249 carrying an idler roller 251 (Figs. 1 and 3), on one end thereof, the opposite arm 252 being engaged by a spring 253 having its end attached to the upright 246 and normally urging the lever in a counterclockwise direction facing Fig. 3 so that as the strip of stock is pulled by the feeding mechanism the lever will rotate slightly in a clockwise direction against the tension of the spring to allow a relatively rapid feeding of the stock. A guide channel 255 similar in form and appearance to that shown at 194 heretofore described is attached to the upright 246 by means of an arm 254, the guide extending downwardly toward the body and having its lower end resting on the top of the guide 56 as will be apparent from Figs. 1 and 3. The guide channel 255 carries a block 256 adapted to rest within the sides of the channel and against the stock, the block being pivotally supported by side arms 257 pivoted to the back of the channel so that the weight of the block rests against the stock within the guide.

Attached to the sides 41 of the body as by a block 258 is an upright bar 259 for supporting a gluing device, the bar having a collar 261 attached thereto. A split sleeve 262 is mounted on the bar above the collar and has cap screws 263 which may be tightened to hold the gluing device in position or loosened to permit the sleeve to be rotated to swing the gluing device to an inoperative position. Attached to the sleeve is a reservoir 264 for holding a supply of adhesive and journaled in the walls of the reservoir in bearings as shown at 265 is a roller 266 adapted, upon rotation, to dip into the contents of the reservoir. Also attached to the sleeve 262 is a spindle 267 rotatably supporting a gear 268 upon one face of which is a tubular transfer device 269 in the nature of a roller adapted to roll in contact with the roller 266. The shaft of the roller 266 carries a gear 271 meshing with the gear 268 and attached to the gear 268 is a sprocket (not shown) over which a chain 272 is trained, this chain also being trained over a sprocket 273 carried on the countershaft 229 so as to be driven therewith. It will thus be seen that upon feeding movement of the roller 214, the rollers of the gluing mechanism are rotated so that adhesive is picked up from the reservoir onto the roller 266 and transferred to the roller 269. The gluing mechanism is so located that the strip of stock from the roll 192 passes over the transfer roller 269 and acquires a coating of adhesive thereon as it passes downward toward the guide. The transfer roller 269 comprises a cup shaped member having a central hub and a cylindrical outer surface as shown in Figs. 1 and 2. Attached to the outer surface are a plurality of pads 274 in this instance formed of rubber, the pads being approximately circular and slightly smaller in diameter than that of the cap blank. Each of the pads is made up of a plurality of concentric upstanding ribs as shown at 275 adapted in use to acquire a coating of adhesive and transfer it to the strip of foil. As the strip of foil and the strip of paper from roll 248 come together in the feed rolls 214 and 215 the adhesive is in part transferred to the paper in a limited area so that the finished preformed cap emerging from the dies comprises a layer of foil and a layer of paper adhered together by the adhesive. The result is that the foil is only partially coated leaving intermediate spaces in which the adhesive may spread as the stock goes through the feed rollers. The shape is such that no adhesive is applied to the salvage portion of the strip and therefore the metal foil in the salvage can be recovered.

*Control mechanism*

Figure 20:
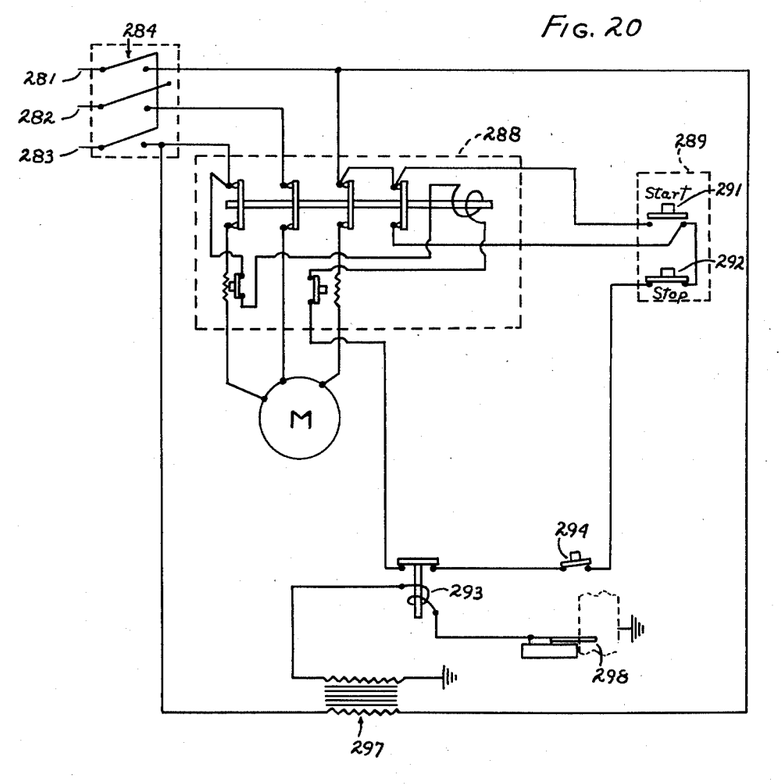
Fig. 20 is a wiring diagram.

Power is supplied to the motor 25 from a suitable source of supply through conductors 281, 282 and 283 (Fig. 20), a disconnect switch 284, and contacts 285, 286 and 287 of a magnetic starter of conventional design indicated generally at 288 (see Fig. 1). The starter is controlled from a conventional push button control 289 having start and stop buttons 291 and 292. In series with the push button control is a normally closed relay 293 and a limit switch 294 spring pressed to open position. As will be seen from Fig. 1 the switch 294 is disposed below a guard plate 295 positioned at the opening between the dies in such fashion that the plate must be rotated about a hinged support 296 in order for the operator to gain access to the dies. The weight of the plate is sufficient to keep the switch 294 closed but when the plate is raised the switch opens, deenergizing the starter and the motor. The coil of relay 293 is in circuit with the secondary coil of a transformer 297 the primary of which is connected between power leads 281 and 283. One terminal of the transformer secondary coil is grounded on the machine and the other terminal is connected through the coil of the relay to a rod 298 supported on an insulating block adjacent the feed rolls to support the rod in spaced relation to the strip of foil in the area between the feed rolls and the dies (Figs. 1, 8 and 14) and is in such position that the foil will contact the rod in the event the foil buckles and fails to properly feed from the rolls to the dies. In the event of such buckling the circuit including the relay coil is also grounded at the rod 298 energizing the relay and opening the relay contacts to deenergize the motor.

I claim:

1. The combination in a machine for forming bottle caps from thin strip stock comprising cooperating bottle cap blanking and forming die elements disposed to have said strip feed thereto along a vertical path, means for supporting a roll of stock for delivery to said die elements, a pair of feed rolls spaced immediately above said cap die elements for feeding the strip therethrough, guide means between the roll of stock and the feed rolls for guiding the strip into the rolls in alignment with the die elements, said guide means comprising an elongated member of substantially greater length than width extending vertically above said feed rolls, said member having a flat bottom for reception of the strip thereagainst and upstanding edges spaced a distance substantially equal to the width of the strip to prevent lateral displacement of the strip as it passes through the guide, and yieldable means for retaining said strip against the flat bottom, means for imparting a stiffening configuration to the strip as it passes through the rolls to maintain alignment of the sheet between the rolls and the die elements and means for intermittently rotating the feed rolls and driving the die elements in timed relationship to successively feed the strip downwardly between the die elements and form successive caps.

2. The combination in a machine for forming bottle caps from strip stock comprising cooperating blanking and forming dies for reception of said stock therebetween to blank and form caps from selected portions of the stock spaced longitudinally thereof, means for rotatably supporting rolls of strip sheet metal stock and strip paper stock for delivery to the dies, a pair of feed rolls disposed in close proximity to said dies for the reception of said metal and paper strips therebetween in superimposed registering relationship to feed a combined strip to the dies, means for applying adhesive to one of said strips within the areas of said selected portions of the stock to adhere the strips together solely in said areas, and means for intermittently rotating said rolls and driving the dies in timed relationship to successively feed the stock between the dies and form successive caps.

3. The combination in a machine for forming bottle caps from strip stock comprising cooperating blanking and forming dies for reception of strip stock therebetween to blank and form caps from selected portions of the stock spaced longitudinally of the strip, means for rotatably supporting rolls of strip sheet metal stock and strip paper stock for delivery to the dies, a pair of feed rolls disposed in close proximity to said dies for the reception of said metal and paper strips therebetween in superimposed registry relationship to feed a combined strip to the dies, guide means for guiding each of the strips of stock into the feed rolls in alignment with the dies, means for applying adhesive to one of said strips within the area of said selected portion of the stock to adhere the strip together solely in said area, and means for intermittently rotating said feed rolls, driving the adhesive applying means and driving the dies all in timed relationship to successively feed stock between the dies and form successive caps.

4. The combination in a machine for forming bottle caps of cooperating male and female die elements for forming successive caps, a support for supporting caps in a stack, means for delivering the caps in succession from the die elements to a stacking position adjacent said cap support and means for moving the cap support in response to each operation of the die elements a distance approximating the thickness of a cap to maintain the end of the stack at the stacking position.

5. The combination in a machine for forming bottle caps of cooperating male and female die elements for forming caps in succession, a shelf for receiving said caps one upon the other to form a stack, means for supporting said shelf for movement up and down, guide rods disposed annularly of the stack to retain the stack in upright position, and means operated in timed relation with the die elements for lowering said shelf to accommodate for increase in the height of the stack.

6. The combination in a machine for forming bottle caps of cooperating male and female die elements for forming caps in succession, a shelf for receiving said caps from the die elements one upon the other to form a stack, means for supporting said shelf for movement up and down in a plane slightly inclined from the vertical, guide rods disposed in said plane and arranged annularly of the stack to retain the stack in an upright position in said plane, ratchet means for lowering said shelf to accommodate for increase in the height of the stack, and means for driving the ratchet means in timed relation with the die elements.

7. The combination in a machine for forming bottle caps of cooperating male and female die elements for forming caps in succession, a shelf for receiving said caps from the die elements one upon the other to form a stack, means for supporting said shelf for movement up and down in a plane slightly inclined from the vertical, guide rods disposed in said plane and arranged annularly of the stack to retain the stack in an upright position in said plane, ratchet means for lowering said shelf to accommodate for increase in the height of the stack, means for driving the ratchet means in timed relation with the die elements and an overrunning clutch disposed between the shelf and the ratchet means for manual movement of the shelf to a lowered position for removal of the stack of caps.

8. The combination in a machine for forming bottle caps of cooperating male and female die elements for forming caps in succession, a shelf for receiving said caps from the die elements one upon the other to form a stack, means for supporting said shelf for movement up and down in a plane slightly inclined from the vertical, guide rods disposed in said plane and arranged annularly of the stack to retain the stack in an upright position in said plane, ratchet means for lowering said shelf to accommodate for increase in the height of the stack, means for driving the ratchet means in timed relation with the die elements, an overrunning clutch disposed between the shelf and the ratchet means for manual movement of the shelf to a lowered position for removal of the stack of caps and a retainer movable into position to receive the caps from the die elements while the stack is being removed from said shelf, said retainer being retractable to deposit the newly forming stack on the shelf upon return of the shelf to an elevated position.

9. The combination in a machine for forming bottle caps from thin strip stock of cooperating male and female die elements, means for feeding successive portions of stock between said die elements, said die elements comprising an annular female blanking die, a male punch receivable in the blanking die to cut a blank from the strip, a female skirt forming die engaged by said punch and serving therewith to retain the blank at its periphery, a male skirt forming die engageable with the blank in spaced relation inwardly from the punch to start the forming of the cap while the blank is retained at its periphery and movable into the female skirt forming die to withdraw the periphery of the skirt from between the punch and the female skirt forming die and complete the formation of an annular skirt on the cap, a female central forming die and a male central forming die engageable therewith as the male skirt forming die withdraws the periphery of the skirt to form the central portion of the cap, means to eject the formed cap from the die elements upon separation thereof, and means to drive the die elements and the stock feeding means in timed relation to form successive caps.

10. The combination in a machine for forming bottle caps from thin strip stock of cooperating male and female die elements, means for feeding successive portions of the stock between said die elements, said female die element comprising a female blanking die and a female forming die assembly comprising a female skirt forming die slidable in the blanking die and spring pressed to a forward position, a female stripping die slidable within the skirt forming die and spring pressed to a forward position, and a female central forming die slidable in the stripping die and spring pressed to a forward position, said male die element comprising a punch receivable in the female blanking die to cut a blank from said strip and engageable with the female skirt forming die to move the same to a rear position to hold the blank at its edge, a stripper disposed on the outer surface of the punch and engageable with the female blanking die to prevent the strip from following the punch upon withdrawal thereof from the female blanking die, and for lubricating the outer surface of the punch, and a male forming die assembly including a male skirt forming die disposed within the punch and movable axially with respect thereto to engage the blank, withdraw the edge of the blank from between the punch and a female skirt forming die and move the same into the female skirt forming die to form a pleated annular skirt on the blank, a male stripper within the male skirt forming die spring pressed to an advanced position and movable therewith and engageable with the female stripper in the forward position of the latter to hold the blank upon withdrawal of the edge thereof, and a male central forming member cooperable with female central forming member to form the central portion of the blank and move the latter to a rear position, means for driving the male die element comprising means to move the male die element as a body toward the female die element to move the punch into the female blanking die to cut the blank, means for advancing the male forming die assembly as a body toward the female die element to first move the male skirt forming die against the blank and start the formation of the skirt, thereafter withdraw the edge of the blank from between the punch and the female skirt forming element and simultaneously advance the male stripper to grip the blank between the male and female stripper and finally to move the male skirt formnig die and male central forming die into seated position in the female die element to complete the formation of the cap, means for retracting the punch at about the time the edge of the blank is withdrawn, means for retracting the male forming die assembly for return movement of the female forming die assembly to the forward position and return of the male stripper to the advanced position to discharge the formed cap from the die elements, and means for driving the advancing means, the retracting means and the stock feeding means in timed relation through successive cycles to feed the stock between the die elements, advance the male die element and retract the male die element for the formation of successive caps.

11. The combination in a machine for forming bottle caps from thin stock of cooperating male and female die elements, said female die element comprising a female blanking die and a female forming die assembly including a female skirt forming die disposed within the female blanking die, a female stripping die, a female central forming die and means for moving the female stripping die and the central forming die to discharge the formed cap from the female forming die assembly, said male die element comprising a punch receivable in the female blanking die to cut a blank from said stock and engageable with the female skirt forming die to hold the blank at its edge, and a male forming die assembly disposed within the punch including a male skirt forming die movable into the female skirt forming die to form an annular skirt on the blank, a male stripping die and a central forming member cooperable with the female central forming die to form the center portion of the cap and means for moving the male stripping die to discharge the formed cap from the male forming die assembly, and means for driving the male die element comprising means to move the male die element as a body toward the female die element to move the punch into the female blanking die, means for advancing the male forming die assembly into seated position in the female forming die assembly, means for retracting the punch and the male forming die assembly for discharge of the cap and reception of stock between the die elements.

12. The combination recited in claim 11 wherein the portion of the female skirt forming die engaged by the blank during the forming thereof comprises a material capable of deformation under the forming pressure to prevent rupture of the blank.

13. The combination recited in claim 11 wherein the portion of the female skirt forming die engaged by the blank during the forming thereof comprises a synthetic resinous material capable of deformation under excessive local forming pressure to prevent rupture of the stock.

14. The combination recited in claim 11 wherein the portion of the female skirt forming die engaged by the blank during the forming thereof comprises a material of limited resiliency in the nature of a synthetic rubber having the shape characteristics of a material moulded against the face of the male skirt forming member.

15. The combination in a machine for forming caps from thin sheet stock of electrically conductive material comprising, a frame, cooperating bottle cap blanking and forming die elements positioned on said frame to receive therebetween a strip of stock for forming a cap therefrom, a pair of feed rollers mounted on said frame and disposed adjacent the die elements to feed the strip into said elements, means including an electric motor connected to a power source for intermittently rotating the feed rolls and for reciprocating the die elements in timed relation to successively feed the strip between the die elements to form a cap, an electric contact insulated from said frame and disposed between the rolls and the die elements and positioned for engagement by the strip upon departure thereof from a prescribed feeding path, circuit means for energizing said frame and said contact from said source of power, said means operable when said strip departs from said prescribed path to close the circuit between the frame and the contact to disconnect said motor from said power source.

RUDOLPH SONNENBERG.

(References on following page)

REFERENCES CITED

The following references are of record in the file of this patent:

UNITED STATES PATENTS

| Number | Name | Date |
|---|---|---|
| 363,205 | Burger | May 17, 1887 |
| 851,214 | Ballard | Apr. 23, 1907 |
| 924,103 | Von Philp | June 8, 1909 |
| 1,018,849 | Speed et al. | Feb. 27, 1912 |
| 1,030,920 | Ranz | July 2, 1912 |
| 1,073,618 | Muller | Sept. 23, 1913 |
| 1,180,469 | Blakeslee | Apr. 25, 1916 |
| 1,293,288 | Wright et al. | Feb. 4, 1919 |
| 1,504,245 | Huntley | Aug. 12, 1924 |
| 1,526,209 | Grupe | Feb. 10, 1925 |
| 1,553,506 | Buchanan | Sept. 15, 1925 |
| 1,566,441 | Smothers | Dec. 22, 1925 |
| 1,814,546 | Carson | July 14, 1931 |
| 1,965,274 | Zanetti | July 3, 1934 |
| 2,076,906 | MacCordy | Apr. 13, 1937 |
| 2,082,167 | MacCordy | June 1, 1937 |
| 2,175,416 | Trump et al. | Oct. 10, 1939 |
| 2,177,652 | Hill | Oct. 31, 1939 |
| 2,200,293 | Pelosi | May 14, 1940 |
| 2,228,372 | Stuhlinger | Jan. 14, 1941 |
| 2,296,889 | Wiley | Sept. 29, 1942 |
| 2,381,851 | Allen | Aug. 7, 1945 |